F. PASCALL.
LID OR COVER FOR RECEPTACLES.
APPLICATION FILED JAN. 3, 1916.
1,251,413.
Patented Dec. 25, 1917.
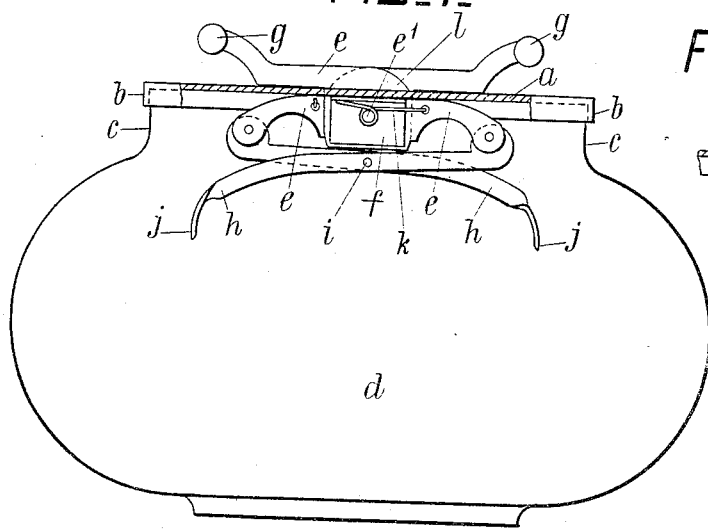
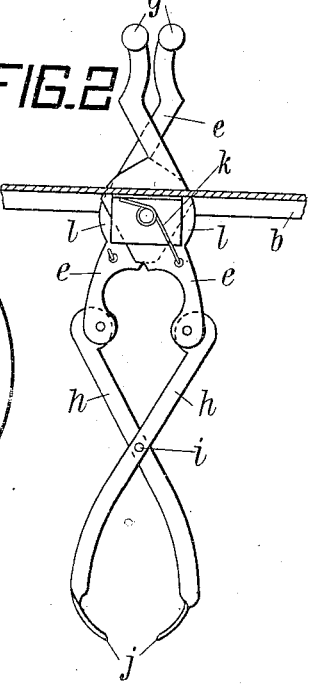
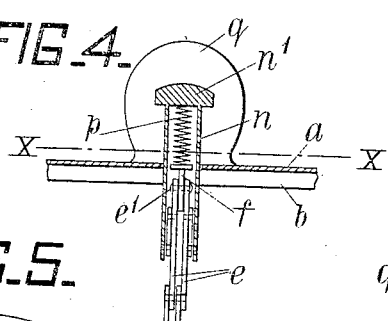
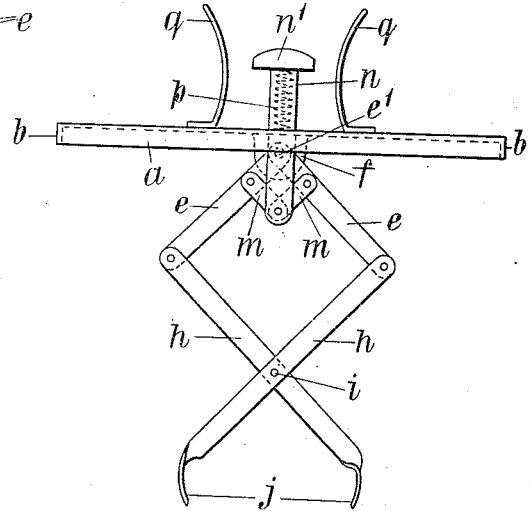
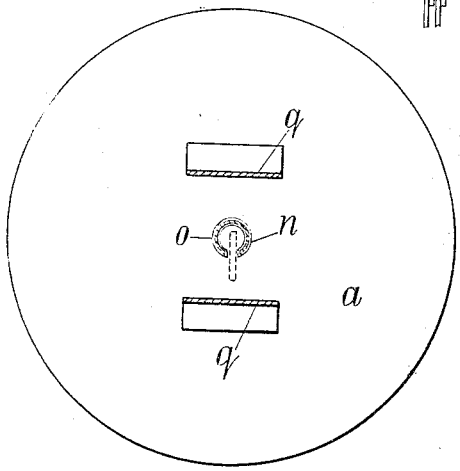
Inventor:
Frank Pascall
by his Attorney

UNITED STATES PATENT OFFICE.

FRANK PASCALL, OF LONDON, ENGLAND.

LID OR COVER FOR RECEPTACLES.

1,251,413.   Specification of Letters Patent.   Patented Dec. 25, 1917.

Application filed January 3, 1916. Serial No. 69,876.

*To all whom it may concern:*

Be it known that I, FRANK PASCALL, a subject of the King of England, residing at London, in England, have invented certain new and useful Improvements in Lids or Covers for Receptacles, of which the following is a specification.

This invention relates to receptacles for solid, granular, powdered or semi-liquid materials, such as bowls or jars for receiving lump or loaf sugar, confectionery, preserves and the like, having a lid or cover adapted to protect the contents against the action of flies and other insects, dust or other foreign matter, with means attached to said lid or cover for removing the contents of the receptacle.

The invention comprises a novel construction of combined lid or cover and contents withdrawing means wherein the latter are of an expansible or extensible and contractible nature so that during the act of removing the lid the user may expand or extend said withdrawing means to grip the contents or part thereof and withdraw same from the receptacle, said removable means being preferably resiliently controlled in order that on release by the user they may return to normal contracted condition against or close to the under surface of the lid or cover.

Embodiments of the invention are represented in the accompanying drawings, wherein, Figure 1 is an elevation of a bowl with the lid partly in section showing one form of contents withdrawing means in contracted or normal position.

Fig. 2 is an elevation with part of the lid in section showing the withdrawing means in extended position.

Fig. 3 is an elevation showing a second form of withdrawing means in extended position.

Fig. 4 is a partial sectional view of Fig. 3, and

Fig. 5 is a sectional plan of the lid on the line X—X of Fig. 4.

The lid or cover $a$ may be of any appropriate shape or design and may be manufactured of any suitable material, being shown as flanged at $b$ to rest upon a rim or edge $c$ of the receptacle $d$ so as to be easy of removal.

Mounted upon said cover, I provide expansible and contractible means for removing the contents of the receptacle, these means being shown as consisting of a lazy-tongs device which in the form shown in Figs. 1 and 2, consist of a pair of crossed levers $e$ pivoted at their point of intersection $e^1$ in a lug $f$ depending from the lower surface of the lid and extending upward through a slot in the lid, their outer or upper ends being provided with knobs, handles or other form of finger-grips $g$. To the lower ends of said levers $e$ are pivotally connected another pair of crossed levers $h$ pivoted together at $i$ and provided, if desired, at their lower ends with claws, prongs, scoops or equivalents $j$ to grip or engage the contents of the receptacle. The levers $l$ are each under the action of a spring $k$ tending to keep the whole lazy-tongs device in the raised or normal position shown in Fig. 1 and further are cranked as at $l$ or otherwise so shaped as to fill as closely as possible the slot in the lid at whatever angle said levers may be in relation to said lid, so as to entirely or substantially preclude the entrance of foreign bodies to the receptacle through the slot.

Obviously any appropriate number of pairs of levers $e$, $h$ may be used according to the depth of the receptacle or other requirements.

The action of the device is simple and will be readily understood, it being merely necessary to grasp and press together the handles $g$ whereupon the levers become extended and the claws or the like grip the contents of the receptacle which are removed together with the lid. On replacing the latter and releasing the handles the levers return to normal position under the action of the springs $k$.

The form of construction shown in Figs. 3 to 5 is similar in principle but in this case the levers $e$ which are pivoted at their point of connection $e^1$ to the lug $f$ terminate below the lid and are pivotally connected by a pair of links $m$ to a hollow member or post $n$ having a knob $n^1$ and slidably mounted in a curved slot $o$ in the lid, said post being under the action of a spring $p$ within same tending to keep it raised and the levers in their upper contracted position. The lid is further provided with two finger pieces or grips $g$ which are grasped by the fingers when removing the lid, another finger being caused to act on the knob $n^1$ to depress the post and through the links $m$ extend the levers $e$, $h$ to grip the contents as before described. On release of the post the spring $p$ returns the parts to normal position.

The springs $k$ and $p$ may be replaced by weights or other means for effecting the purpose stated.

Obviously the entire lid need not of necessity be removed together with the contents withdrawing means, but said lid may be made in a plurality of parts, that part only which supports the withdrawing means being removable therewith.

What I claim as my invention and desire to secure by Letters Patent of the United States is:—

1. The combination in a receptacle of a lid or cover member therefor having a depending lug, a plurality of pairs of pivotally connected levers pivoted to said lug, means for manually extending said levers into the receptacle to engage and grip the contents thereof and spring means for returning said levers to contracted position on release of the extending means.

2. The combination in a receptacle of a lid or cover member therefor having a depending lug, a plurality of pairs of pivotally interconnected levers pivoted to said lug, that pair of levers adjacent the lid member extending therethrough to permit manual operation to extend the levers into the receptacle, and springs mounted on the lug and connected to said last mentioned levers for returning all the levers to contracted condition adjacent the lid member.

3. The combination in a receptacle of a lid or cover member therefor and means carried by said lid member for removing the contents of the receptacle comprising a lazy-tongs device having elements pivotally attached to said lid member and extending into the receptacle and other elements extending above the lid member and adapted to be manipulated to permit expansion and contraction of the first mentioned elements in directions to and from said lid member.

In witness whereof I have signed this specification.

FRANK PASCALL.

Copies of this patent may be obtained for five cents each, by addressing the "Commissioner of Patents, Washington, D. C."